(12) United States Patent
Bogaerts et al.

(10) Patent No.: US 12,234,180 B2
(45) Date of Patent: Feb. 25, 2025

(54) GLASS SHEET WITH HIGH NEAR-IR TRANSMISSION AND VERY LOW VISIBLE TRANSMISSION

(71) Applicant: AGC GLASS EUROPE, Louvain-la-neuve (BE)

(72) Inventors: Michel Bogaerts, Braine-le-Chateau (BE); Yannick Sartenaer, Vedrin (BE); François Boland, Gembloux (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 843 days.

(21) Appl. No.: 17/275,916

(22) PCT Filed: Aug. 28, 2019

(86) PCT No.: PCT/EP2019/072990
§ 371 (c)(1),
(2) Date: Mar. 12, 2021

(87) PCT Pub. No.: WO2020/057926
PCT Pub. Date: Mar. 26, 2020

(65) Prior Publication Data
US 2021/0309561 A1    Oct. 7, 2021

(30) Foreign Application Priority Data
Sep. 17, 2018    (EP) ..................................... 18194808

(51) Int. Cl.
*C03C 3/085*    (2006.01)
*C03C 3/087*    (2006.01)
*C03C 4/10*    (2006.01)

(52) U.S. Cl.
CPC .............. *C03C 3/085* (2013.01); *C03C 3/087* (2013.01); *C03C 4/10* (2013.01)

(58) Field of Classification Search
CPC ............ C03C 3/085; C03C 3/087; C03C 4/10
See application file for complete search history.

(56) References Cited

U.S. PATENT DOCUMENTS 6,001,494 A    12/1999 Kuchinski et al.

FOREIGN PATENT DOCUMENTS

| DE | 196 54 077 A1 | 6/1998 |
|---|---|---|
| SU | 321485 A1 | 1/1972 |

OTHER PUBLICATIONS

International Search Report issued on Oct. 25, 2019 in PCT/EP2019/072990 filed on Aug. 28, 2019.

*Primary Examiner* — Elizabeth A. Bolden
(74) *Attorney, Agent, or Firm* — Oblon, McClelland, Maier & Neustadt, L.L.P.

(57) ABSTRACT

A silicate-type glass sheet that includes 0.002-1.1% total iron (expressed as $Fe_2O_3$), greater than or equal to 0.005% manganese (expressed as MnO), and optionally 0-1.3% chromium (expressed as $Cr_2O_3$). The sum of the contents of total iron, manganese, and chromium, expressed as weight percentages are greater than or equal to 1% of the total weight of the glass. The ratios R1, defined as $Fe_2O_3^*/(49+0.43(Cr_2O_3^*-MnO^*))$, and R2, defined as $Fe_2O_3^*/(34+0.3(Cr_2O_3^*-MnO^*))$, both being less than 1. $Fe_2O_3^*$, $MnO^*$ and $Cr_2O_3^*$ represent the relative percentages with respect to the sum of $(Fe_2O_3+MnO+Cr_2O_3)$. Such a glass sheet shows a very low visible transmission together with high IR transmission in the region 1000-2000 nm, especially at wavelengths of interest between 1050 and 1550 nm, thereby valuable within the context of autonomous cars, in particular those fully integrating LiDAR systems.

21 Claims, 1 Drawing Sheet

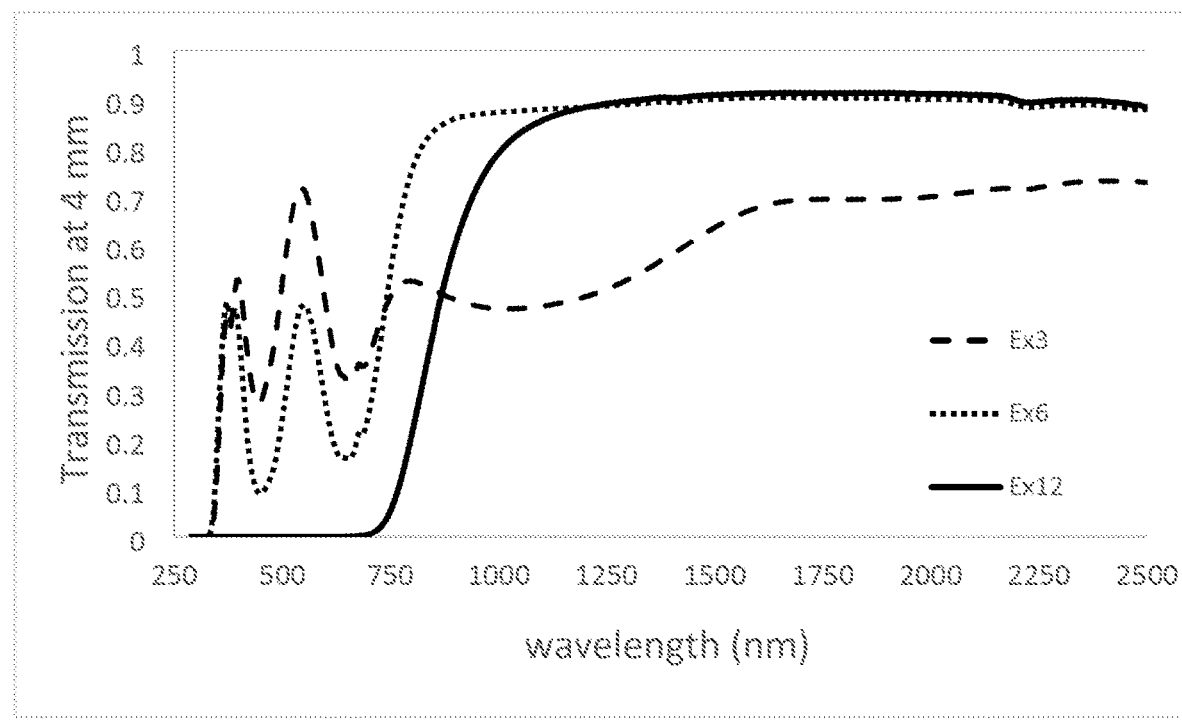

GLASS SHEET WITH HIGH NEAR-IR TRANSMISSION AND VERY LOW VISIBLE TRANSMISSION

1. TECHNICAL FIELD OF THE INVENTION

The present invention relates to a silicate glass sheet with a high transmission in the near infrared region, but with a very low transmission in the visible range.

This invention is particularly suitable within the context of autonomous cars, in particular those fully integrating LiDAR systems.

2. DESCRIPTION OF THE PRIOR ART

The need for IR applications is continuously growing, in particular with the current spectacular development of autonomous cars, largely relying on LiDAR systems. Today, the trends and demand from the market is to have those LIDAR systems fully integrated in the car (for numerous evident reasons like aesthetic and preventing damages to the system) and, in particular, mounted behind internal face of one or more of its glazings (rear window/rear windshield/back windshield and/or glass trims). The last developments in LIDAR technologies for autonomous cars use two main wavelength ranges of interest, namely 1000-1100 nm (especially 1050 nm) and 1500-2000 nm (especially 1550 nm).

Regular glasses used in automotive (clear, colored, coated, etc) are of soda-lime-silicate type and have the advantages, amongst others, to be highly mechanically, chemically and ageing resistant, with limited costs. However, those glasses show such a poor near-IR transmission that the use of LIDAR systems mounted behind is not feasible due to high IR signal loss by absorption in said glass.

Recently, it has been proposed to use a specific glass composition which allows getting a glazing with a significantly higher transmission in the near IR region, in particular in the range 750-1050 nm (absorption coefficient <5 m$^{-1}$), while keeping the high level in visible transmission requested for vision glazing in cars (rear window/rear windshield/back windshield). This solution is described notably on PCT publication WO2018/015312A1. However, as these described glass compositions show a high visible transmission, any element placed behind, like the LIDAR system, is visible from the outside of the car and thereby greatly deteriorate its aesthetics.

It has recently been proposed in WO2018/015313A1 to combine the known IR transmissive glass sheet with an IR transparent tinted/opaque coating in order to hide the unaesthetic element of the LIDAR system from the outside while ensuring a good level of operating performances of said system. This coating may, for example, be a layer of black ink or a black film having no (or very low) transmission in the visible range but having a high transmission in the infrared range of interest for the application. Such ink or film are generally made of organic compounds. Unfortunately, this solution of combining a "clear" or transparent glass sheet with a black layer/film has several drawbacks like the poor resistance of the layer/film (compared to the glass itself) thereby weakening the assembly and also the fact that it requires to laminate this coated glass sheet with another sheet. Finally, it is really difficult to curve/bend in various shapes a glass sheet covered with such a black layer/film.

Out of the context of autonomous cars and LIDAR technologies, the art has also proposed some glasses being highly colored to opaque in the bulk and showing also very good transmission performances in the near IR range:

Special glasses named Chalcogenide glasses are based on chalcogens (Sulphur S, Selenium Se or Tellurium Te) and do not contain oxygen. Chalcogenide glasses are indeed known as having a large transparency window in the infrared and some compositions can be opaque to visible radiations. However, such glasses have two major drawbacks. First, chalcogenide glasses have very poor mechanical resistance. For instance, reported hardness values for chalcogenide glasses range between 0.39-2.35 GPa (compared to 4.8-5.0 GPa for soda-lime-silicate glasses). Secondly, chalcogenide glasses are known for their high expensiveness: in addition to very expensive raw materials, no oxygen contamination is tolerated during the synthesis of chalcogenide glass, which require complicate production furnaces with inherent limitation in term of size, quantity and price of glass pieces. Finally, chalcogenide glasses pose also some severe environmental issues. These drawbacks clearly prevent their use in replacement of classically used soda-lime-silicate glasses, i.e. in the automotive field.

a specially designed soda-lime-silicate glass composition is described in WO2015/091106 in the context of IR touch displays. It comprises, in a soda-lime silicate based matrix, chromium and cobalt in specific amounts and shows a very intense color to opacity together with good performance in terms of near IR transmission. Unfortunately, its IR transmission reaches high values only for limited wavelengths between 850-950 nm, which prevents its use for the LIDAR technologies requesting high IR transmission for higher wavelengths, i.e. 1000-1100 and/or 1500-2000 nm, especially 1050 nm and 1550 nm, for example for eye safety requirements. In particular, the composition of this known glass comprises total iron from 0.002-0.06 wt %; chromium (as $Cr_2O_3$) from 0.0015% to 1% and cobalt (as Co) from 0.0001% to 1%, the chromium content being such that: $Cr_2O_3>(-17*Co)+0.0535$.

Hence, the state of the art does not provide any solution to provide a (soda-lime-)silicate type glass with a high near IR transmission, especially in the range 1000-2000 nm, together with a very low or zero visible transmission, without the need of an additional black/opaque layer/film.

Though, in a context of quick development and eager market request for operational autonomous cars combined with increased request of the consumers for aesthetic, there is clearly a need to have a silicate-type glass sheet showing a high transmission in the near IR range and especially 1000-2000 nm, and having intrinsically a very low or close to zero transmission in the visible range (meaning highly colored to opaque in the bulk). Such a glass sheet mounted in a car (i.e. as a trim) would then allow placing a LIDAR system (for example, using the range 1000-2000 nm) behind its internal face while, at the same time:

ensuring good performances of the LIDAR system;
hiding the unaesthetic element(s) of said system from the outside of the car; and
preserving the level of intrinsic resistance (mechanical, chemical, ageing) of regular glass; and
achieving reasonable costs.

Such a glass sheet would also be very useful as cover lens for the LIDAR sensors themselves. Conventional cover lenses are made of plastic which provide proper infrared transmission but are very poor in terms of durability. Plastics offer indeed poor mechanical and chemical resistances.

Basically, glass would be a material of choice as a result of its mechanical properties, its durability, its resistance to scratching and also because it can be, if required, chemically or thermally strengthened. Furthermore, compared to plastic, glass, because of its higher melting point and lower CTE, is more appropriate when heated, i.e. when combined with a defrosting system in automotive application.

3. OBJECTIVES OF THE INVENTION

The present invention has notably the objective of overcoming the cited drawbacks of the prior art.

More precisely, one objective of the invention is to provide a silicate type glass sheet with a high near IR transmission, especially in the region 1000-2000 nm, together with a very low or zero visible transmission while not deteriorating the resistance property of the sheet.

In particular, an objective of the invention is to provide a silicate type glass sheet with a high near IR transmission, especially in the range 1000-2000 nm, together with a very low or zero visible transmission, due to its intrinsic properties thereby without the need of an additional black/opaque layer/film.

Another objective of the invention is to supply a solution to the disadvantages of the prior art that is simple to manufacture and inexpensive.

4. BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

The FIGURE is a graph depicting transmission over a wavelength range, according to certain embodiments of the present disclosure.

5. DETAILED DESCRIPTION OF THE INVENTION

The invention relates to a glass sheet of silicate-type having a composition:
(i) comprising, in a content expressed as weight percentages, by total weight of glass:

| | |
|---|---|
| Total iron (expressed as $Fe_2O_3$) | 0.002-1.1 %; |
| Manganese (expressed as MnO) | ≥0.005 %; |
| and optionally, | |
| Chromium (expressed as $Cr_2O_3$) | 0-1.3 %, | and
(ii) having:
the sum ($Fe_2O_3$+MnO+$Cr_2O_3$) of the contents of total iron, manganese and chromium, expressed as weight percentages, 1%
the ratio R1 defined as $Fe_2O_3*/(49+0.43\ (Cr_2O_3*-MnO*))<1$;
the ratio R2 defined as $Fe_2O_3*/(34+0.3\ (Cr_2O_3*-MnO*))<1$; $Fe_2O_3*$, MnO* and $Cr_2O_3*$ being relative percentages with respect to the sum ($Fe_2O_3$+MnO+$Cr_2O_3$).

Hence, the invention lies on a novel and inventive approach since it enables to find a solution for the disadvantages of prior art. The inventors have indeed found that, surprisingly, adding manganese in specific amounts in a low/mid-iron glass matrix (total iron from 20 to 1000 ppm) while addressing specific ratio R1 and R2 allows to reach a glass sheet showing intrinsically a very low visible transmission together with high IR transmission in the region 1000-2000 nm, especially at wavelengths of interest 1050 and 1550 nm.

In order to obtain high transmission in the infrared region in soda-lime silicate glasses including intrinsically some amounts of iron coming as an impurity in the majority of the starting materials used, it is known to reduce at maximum the amount of ferrous $Fe^{2+}$ ions in the glass. Indeed, ferrous ions (sometimes expressed as oxide FeO) in soda-lime-silicate glasses absorb in the near infrared region due to their broad absorption band centered on 1050 nm. In known chromium-containing low-iron glasses, as described for example in WO2015/091106, chromium is added in an amount adapted to oxidize all $Fe^{2+}$ into $Fe^{3+}$ in order to get high near-IR transmission. As chromium is known since years as a classical powerful colorants for glass, increasing further the chromium content of the glass above the threshold required to fully oxidized iron will bring a strong decreasing of visible transmission while keeping the low level of IR transmission as $Fe^{2+}$ is at zero-amount and as it is known that no absorption of $Cr^{3+}$ or $Cr^{6+}$ ions occurs above 850 nm (Bamford). It was however surprisingly observed by the inventors that this result expected based on what is known in the art was not reached. Indeed, starting from a chromium-containing glass with no Fe' is detected and progressively adding further $Cr_2O_3$ decreases the near-IR transmission (especially at 1050 and 1550 nm). As an illustration, in such chromium-containing glass, low visible transmission is indeed obtained (TL<10%) with $Cr_2O_3$ amounts >1.3 wt % but IR transmission at 1050 nm ($T_{1050}$) drops below 88%.

We observed that addition of significant amounts of manganese to the glass, optionally in combination with some amounts of chromium, has a far better efficiency to reach the objective of the invention compared to glasses containing only chromium in high amounts. Manganese, in the $Mn^{3+}$ oxidation state, absorbs visible radiations thanks to a wide absorption bands at ~490 nm and have a small absorption band reported near 1000 nm (Bamford). The other reported valence of manganese in glass at melting conditions encountered in industrial furnaces is $Mn^{2+}$ which has almost no absorption in the visible and near IR wavelengths. The fact that coloring/opacifying the glass with manganese gives better near IR transmissions for a similar level of visible transmission was then unexpected.

In present description and claims, to quantify the visible transmission (also called luminous transmission/transmittance or TL) of a glass sheet, one considers the visible transmission with illuminant D65 for a sheet thickness of 4 mm (TLD4) at a solid angle of observation of 2° (according to standard 1509050). The visible transmission (TL) represents the percentage of radiation flux emitted between wavelengths 380 nm and 780 nm which is transmitted through the glass sheet.

In present description and claims also, to quantify the IR transmission, one considers the transmission for a sheet thickness of 4 mm at a solid angle of observation of 2° (according to standard 1509050), representing the percentage of radiation flux emitted at a specific wavelength in the near IR range namely 1050 nm ($T_{1050}$) and 1550 nm ($T_{1550}$) which is transmitted through the glass sheet.

Other features and advantages of the invention will be made clearer from reading the following description of preferred embodiments and figures, given by way of simple illustrative and non-restrictive examples.

Throughout the present text, when a range is indicated, the extremities are included, except if explicitly described in another way. In addition, all the integral and subdomain values in the numerical range are expressly included as if explicitly written. Also, throughout the present text, the values of content are in percentage by weight expressed with respect to the total weight of the glass (also mentioned as wt %), except if explicitly described in another way (i.e. in ppm). Moreover, when a glass composition is given, this relates to the bulk composition of the glass.

The term "glass", within the meaning of the invention, is understood to mean a completely amorphous material, thus excluding any crystalline material, even partially crystalline material (such as, for example, glass-crystalline or glass-ceramic materials).

The glass sheet of the invention may be manufactured starting from melting a glass raw materials batch in a glass melting furnace/tank and then forming the resulting molten glass into the desired shape, using a floating process, a drawing process, a rolling process or any other process known to manufacture a glass sheet starting from a molten glass composition. In an embodiment of the invention, the glass sheet is a float glass sheet. The term "float glass sheet" is understood to mean a glass sheet formed by the known float glass process. Other forming/processing treatment may follow the manufacturing process.

By "glass sheet" in present invention, it is meant a glass article in a sheet-like form including flat glass, curved glass, bent glass, lens, etc.

The glass sheet according to the invention may have varied sizes, from small sizes (for example, for cover lenses), through medium sizes (for example, for automotive glazings) to very large sizes (up to "DLF" or "PLF" sizes). The glass sheet according to the invention may also have a thickness of from 0.1 to 25 mm, depending on the targeted applications. Preferably, the glass sheet according to the invention has a thickness of from 1 to 8 mm and, more preferably, from 1.5 to 5 mm.

According to the invention, the composition of the invention comprises total iron (expressed in terms of $Fe_2O_3$) as follows: 0.002-1.1 wt %. In present description, when talking about total iron content in glass composition, "total iron" and "$Fe_2O_3$" are used as well and total iron is expressed in terms of $Fe_2O_3$. The minimum value of 0.002 wt % makes it possible not to excessively damage the cost of the glass as such low iron values often require expensive, very pure starting materials and/or their purification. According to an embodiment, the composition comprises total iron as follows: 0.002-0.6 wt %. Preferably, the composition comprises total iron as follows: 0.002-0.4 wt %. More preferably, the composition comprises total iron as follows: 0.002-0.2 wt %, or even 0.002-0.1 wt %. In a very preferred embodiment, the composition comprises total iron as follows: 0.002-0.08 wt % or even, 0.002-0.06 wt %. In a most preferred embodiment, the composition comprises total iron as follows: 0.002-0.04 wt %, or even, 0.002-0.02 wt %. The decreasing of maximum value in total iron allows reaching a lower visible transmission for a given amount of manganese.

According to an embodiment of the invention, the glass sheet comprises manganese (expressed as MnO)≤5%. Preferably, the composition comprises manganese (expressed as MnO)≤4%. More preferably, the composition comprises manganese (expressed as MnO)≤3%.

According to the invention, the composition has a sum ($Fe_2O_3$+MnO+$Cr_2O_3$) of the contents of total iron, manganese and chromium, expressed as weight percentages, 1%. Preferably, the sum ($Fe_2O_3$+MnO+$Cr_2O_3$) of the contents of total iron, manganese and chromium, expressed as weight percentages, 1.1%. More preferably, the sum ($Fe_2O_3$+MnO+$Cr_2O_3$) of the contents of total iron, manganese and chromium, expressed as weight percentages, 1.2%. These embodiments have the advantages to decrease visible transmission.

According to the invention, the composition has a ratio R1 defined as ($Fe_2O_3$*/(49+0.43($Cr_2O_3$*−MnO*))<1. Such R1 values allows reaching complete oxidization of iron into Fe', thereby to avoiding Fe' species which absorb in the near infrared region.

According to the invention, the composition has a ratio R2 defined as $Fe_2O_3$*/(34+0.3 ($Cr_2O_3$*−MnO*))<1. Such R2 values allows reaching very low visible transmission to even opacity.

According to an embodiment of the invention, the glass sheet has a visible transmission TLD4 lower than 20% and preferably lower than 15%, or even lower than 12%. More preferably, the glass sheet has a visible transmission TLD4 lower than 10%, or even lower than 8%, or better lower than 6%, or even more better lower than 5%. Opacity is improved when TLD4 decreases more and more. Ideally, the glass sheet has a visible transmission TLD4 lower than 2%, even lower than 1%. Complete opacity is reached when TLD4 approaches closely or equals to 0.

According to another embodiment of the invention, the glass sheet has a transmission $T_{1050}$ higher than 80% and preferably higher than 82%. More preferably, the glass sheet has a transmission $T_{1050}$ higher than 85% and very preferably higher than 87%. In a very preferred embodiment, the glass sheet has a transmission $T_{1050}$ higher than 90%.

According to still another embodiment of the invention, the glass sheet has a transmission $T_{1550}$ higher than 80% and preferably higher than 85%. More preferably, the glass sheet has a transmission $T_{1550}$ higher than 87% and very preferably higher than 90%.

In the invention, the composition comprises optionally chromium, expressed as $Cr_2O_3$, as follows: 0-1.3%. Herein, the term "optionally" linked to chromium means that (i) the content in $Cr_2O_3$ may be 0 wt % (the composition being free of chromium, in the limit of detection of commonly used techniques to analyze glass compositions) and (ii) the composition may comprise $Cr_2O_3$ up to an amount of 1.3 wt %.

According to the invention, the composition of the invention comprises manganese (expressed as MnO) 0.005%. Preferably, the composition comprises manganese (expressed as MnO) 0.01%. More preferably, the composition comprises manganese (expressed as MnO) 0.02%, or better 0.02%, The increasing of minimum value in manganese allows reaching a lower visible transmission for a given amount of total iron, even if it impacts negatively the near IR transmission in a moderate manner.

Preferably, the composition comprises optionally chromium, expressed as $Cr_2O_3$, as follows: 0-0.8%, or even 0-0.5% or even better 0-0.3%. More preferably, the composition comprises optionally chromium, expressed as $Cr_2O_3$, as follows: 0-0.15%, or even 0-0.1% or even better 0-0.06%. In a most preferred embodiment, the composition comprises optionally chromium, expressed as $Cr_2O_3$, as follows: 0-0.02%, or even 0-0.01%. Such a decrease of the upper limit in $Cr_2O_3$ allows getting better transmission performances at 1050 and 1550 nm.

Advantageously, the composition of the glass sheet is free of $Cr_2O_3$. By free of $Cr_2O_3$, it is meant that the composition has a $Cr_2O_3$ content <0.0005 wt %, preferably <0.0003 wt %. This embodiment is advantageous in that:
- chromium is a chemical species that is preferably avoided in consumers goods in general for medical and environment reasons; and
- better results are obtained: for a given visible transmission, the $T_{1050}$ and $T_{1550}$ are higher.

According to a first main alternative of the invention, the composition comprises:

| | |
|---|---|
| Manganese (expressed as MnO) | >1 %; and |
| Chromium (expressed as $Cr_2O_3$) | 0-0.15 %. |

Such an embodiment is particularly advantageous as it allows to reach low visible transmission with a very high transmission at 1050 and 1550 nm. According to this first main alternative of the invention, preferably, the composition comprises total iron (expressed as $Fe_2O_3$) as follows: 0.002-0.2% and more preferably, 0.002-0.1%, or even 0.002-0.04%. According to this first main alternative of the invention, preferably also, the composition comprises manganese, expressed as MnO, as follows: 1.1% or even 1.2, or even better 1.3%. According to this first main alternative of the invention, preferably also, the composition comprises chromium, expressed as $Cr_2O_3$, as follows: 0-0.1%, or even 0-0.06% or even 0-0.02%, or even better 0-0.01%. In a most preferred embodiment according to this first main alternative, the composition is free of $Cr_2O_3$. Alternatively, according to this first main alternative of the invention, the composition comprises chromium, expressed as $Cr_2O_3$, as follows: 0.0005-0.15%, or even 0.001-0.15% or even 0.002-0.15%.

According to a second main alternative of the invention, the composition comprises:

| | |
|---|---|
| Manganese (expressed as MnO) | 0.005-1 %; and |
| Chromium (expressed as $Cr_2O_3$) | 0.2-1.3 %. |

Such an embodiment is particularly advantageous as it allows to reach low visible transmission with a high transmission at 1050 and 1550 nm. According to this second main alternative of the invention, preferably, the composition comprises manganese (expressed as MnO) as follows: 0.01-1% or even, 0.05-1%, or even better 0.1-1%. More preferably, the composition comprises manganese (expressed as MnO) as follows: 0.2-1% or even, 0.3-1%, or even better 0.4-1%. According to this second main alternative of the invention, preferably also, the composition comprises chromium, expressed as $Cr_2O_3$, as follows: 0.2-1.1%, or even 0.2-1% or even 0.2-0.8%, or even better 0.2-0.7%.

First and second main alternatives of the invention may be combined, when compatible, with one or more particular embodiment(s) described herein.

Advantageously, the composition of the glass sheet has a ratio R3, defined as $MnO/(MnO+Cr_2O_3)>0.3$, each content being expressed in wt %. Preferably, the ratio R3>0.5 or better R3>0.7. More preferably, R3>0.9. Such an increase of lower range in R3 allows, getting better transmission performances at 1050 and 1550 nm, while keeping TL very low.

According to an advantageous embodiment of the invention, the composition comprises vanadium (expressed as $V_2O_5$) as follows: 0.005-0.3%. Such an embodiment allows giving to the glass sheet an UV-cut properties, meaning that presence of vanadium in the composition results in a significant absorption of radiations in the UV range.

The glass sheet according to the invention may be a glass sheet obtained by a float process, a drawing process, or a rolling process or any other known process for manufacturing a glass sheet from a molten glass composition. According to a preferred embodiment according to the invention, the glass sheet is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The silicate glass sheet according to the invention is made of glass which may belong to various categories. The glass can thus be a glass of soda-lime-silicate, aluminosilicate or borosilicate type, and the like. Preferably, the composition of the glass sheet comprises the following in weight percentage, expressed with respect to the total weight of glass:

| | |
|---|---|
| $SiO_2$ | 40-78 % |
| $Al_2O_3$ | 0-18 % |
| $B_2O_3$ | 0-18 % |
| $Na_2O$ | 0-20 % |
| CaO | 0-15 % |
| MgO | 0-10 % |
| $K_2O$ | 0-10 % |
| BaO | 0-5 %. |

In an embodiment, the composition of the glass sheet comprises MgO≥0.1% and preferably, MgO≥0.5%.

More preferably, notably for low production costs reasons, the glass composition is a soda-lime-silicate-type glass. According to this embodiment, by "soda-lime-silicate-type glass", it is meant that the composition comprises the following in weight percentage, expressed with respect to the total weight of glass:

| | |
|---|---|
| $SiO_2$ | 60-78 wt % |
| $Al_2O_3$ | 0-8 wt % |
| $B_2O_3$ | 0-4 wt % |
| CaO | 0-15 wt % |
| MgO | 0-10 wt % |
| $Na_2O$ | 5-20 wt % |
| $K_2O$ | 0-10 wt % |
| BaO | 0-5 wt %. |

According to this embodiment, preferably, the glass composition comprises the following in weight percentage, expressed with respect to the total weight of glass:

| | |
|---|---|
| $SiO_2$ | 60-78 wt % |
| $Al_2O_3$ | 0-6 wt % |
| $B_2O_3$ | 0-1 wt % |
| CaO | 5-15 wt % |
| MgO | 0-8 wt % |
| $Na_2O$ | 10-20 wt % |
| $K_2O$ | 0-10 wt % |
| BaO | 0-1 wt %. |

In another embodiment of the invention, the composition comprises the following in weight percentage, expressed with respect to the total weight of glass:

$65 \leq SiO_2 \leq 78$ wt %
$5 \leq Na_2O \leq 20$ wt %
$0 \leq K_2O < 5$ wt %
$1 \leq Al_2O_3 < 6$ wt %
$0 \leq CaO < 4.5$ wt %
$4 \leq MgO \leq 12$ wt %
$(MgO/(MgO+CaO)) \geq 0.5$.

In particular, examples of base glass matrixes for the composition according to the invention are described in published PCT patent applications WO2015/150207A1, WO2015/150403A1, WO2016/091672, WO2016/169823 and WO2018/001965.

The composition of the glass sheet can comprise, in addition to the impurities present in particular in the starting materials, a low proportion of additives (such as agents which help the melting or the refining of the glass) or of components originating from the dissolution of the refractories constituting the melting furnaces.

The glass composition of the invention may also comprise some other colorants than those described in relation with present invention (namely iron, manganese and chromium), as impurities due mainly to particular contaminated raw materials. Examples of such impurities are molybdenum, cobalt, nickel, copper.

Advantageously, the glass sheet of the invention may be tempered, mechanically or chemically. It may also be bended/curved, or in a general manner, deformed to reach any desired configuration (by cold-bending, thermoforming, . . . ). It may also be laminated.

According to one embodiment of the invention, the glass sheet of the invention may be covered by at least one coating. Examples of such coating are:
- a transparent and electrically conducting thin layer (i.e. a layer based on $SnO_2:F$, $SnO_2:Sb$ or ITO (indium tin oxide), ZnO:Al or also ZnO:Ga;
- an antireflection layer;
- an anti-fingerprint layer or has been treated so as to reduce or prevent fingerprints from registering;
- a lay-out of black enamel for aesthetics and improvement of bonding;
- a network of silverprint for heating function; and/or
- an anti-soiling and/or hydrophobic layer.

According to the targeted applications and/or properties desired, other layer(s)/treatment(s) can be deposited/done on one and/or the other face of the glass sheet according to the invention.

The glass sheet of the invention can advantageously be used as an automotive glazing, especially as a trim. In such a case, in the context of autonomous cars, a LIDAR system may be fully integrated in the car (thereby guaranteeing aesthetic and preventing damages to the system), mounted behind internal face of said glazing.

Therefore, the invention also relates to the use of the glass sheet according to the invention in:
- as an automotive glazing, preferably as a trim element; or
- as a cover lens for a LIDAR sensor.

Even if the context of present invention has been described with the specific application of car-integrated LIDAR systems, the glass sheet of the invention can also advantageously be used in any other technology requiring very low transmission or a very intense colour for the glass, together with very good performances in the near IR range, especially for 1000-1550 nm. For example, it can be enhanceable in value in the "Planar Scatter Detection" (PSD) or "Frustrated Total Internal Reflection" (FTIR) optical technology for detecting the position of one or more objects (for example, a finger or a stylus) on a surface of said sheet which, in view of its more or less intense to opaque color, is capable of partially or completely hiding objects/components found behind/under it.

Still as examples of uses, the glass sheet of the invention can also be enhanced in value:
(1) as decorative panel positioned in front of/around radiant heating, hiding (partially or completely) the unattractive side of the heating but allowing the IR radiation to pass and thus making possible a good output from said heating;
(2) as architectural or decorative spandrel glass;
(3) as cooking plate, in replacement of the expensive special glasses commonly used (vitroceram or borofloat or even pyrex);
(4) as pointing device on portable computers (commonly known as "touchpad"), sometimes using a technology requiring infrared radiation. In this case, the glass sheet is preferably very dark, indeed even opaque, in color and thus hides the electronic components located under it;
(5) as front face element of furniture and in particular of furniture intended to include remote controllable electrical/electronic appliances, hiding from view the unattractive side of such appliances but allowing the signal emitted by the remote controls to pass. This is because the majority of domestic electrical/electronic appliances (televisions, hi-fis, DVD players, games consoles, and the like) are remote controllable using a housing which emits signals in the near infrared region. However, this remote control system exhibits in particular two disadvantages: (i) the signal is often disrupted by the presence of secondary radiation in the visible region (sun, lights), which render it less sensitive, and (ii) it requires that the appliances be reachable by the IR signal of the remote control and thus these cannot be concealed inside an item of furniture, even if demand is nevertheless proceeding in this direction for aesthetic reasons.

Embodiments of the invention will now be further described, by way of examples only, together with some comparative examples, not in accordance with the invention. The following examples are provided for illustrative purposes, and are not intended to limit the scope of this invention.

EXAMPLES

Different glass sheets/samples according to the invention and not according to the invention (comparative) were prepared, with variable amounts of total iron, manganese and chromium, as 3 sets of examples.

For the preparation of the glass samples from sets #1-2, the starting materials were mixed in the powder form and placed in a crucible for the melting, according to an identical base composition specified in the table below, and to which were added starting materials comprising total iron, manganese and chromium in variable amounts as a function of the contents targeted in the final composition (it should be noted that the iron being already, at least in part, present in the starting materials of the base composition as impurity).

| Base composition for Sets #1-2 | Content [% by weight] |
|---|---|
| CaO | 8.86 |
| $K_2O$ | 0.01 |
| $Na_2O$ | 12.96 |

-continued

| Base composition for Sets #1-2 | Content [% by weight] |
|---|---|
| $SO_3$ | 0.41 |
| $Al_2O_3$ | 0.03 |
| MgO | 4.07 |
| $SiO_2$ | to 100% |

For the preparation of the glass samples from set #3, the starting materials were mixed in the powder form and placed in a crucible for the melting, according to a varying base compositions, and to which were added starting materials comprising total iron, manganese and chromium in fixed amounts.

The optical properties of each sample, moulded and processed in the form of a sheet, were determined on a Perkin Elmer Lambda 950 spectrophotometer equipped with an integrating sphere with a diameter of 150 mm, and in particular:

- the near-infrared transmission was determined according to the ISO9050 standard for a thickness of 4 mm at a solid angle of observation of 2° and for specific wavelengths, namely 1050 nm ($T_{1050}$) and 1550 nm ($T_{1550}$);
- the light transmission TL was also determined according to the ISO9050 standard for a thickness of 4 mm at a solid observation angle of 2° (with illuminant D65) and for a wavelength range between 380 and 780 nm.

Set #1

Examples 9 to 13 correspond to glass sheets according to the invention. Example 1 (comparative) corresponds to a low-iron glass with chromium and cobalt according to WO2015/091106. Examples 2-7 (comparative) correspond to glass sheets with manganese and chromium, not in accordance with the invention. Example 8 (comparative) corresponds to a glass sheet with manganese, not in accordance with the invention.

Each Example 9-13 according to the invention was optimized so as:

- to maximize its transmission of near infrared radiation, especially at 1050 and 1550 nm, to reach in particular values above 80% and better above 85-90%;
- while minimizing its visible transmission TL, in particular to reach values<20% and more preferably values below 10%, 5% (reaching then a good opacity).

Table 1 presents the optical properties for Examples 1 to 13, their respective amounts of iron, manganese and chromium (and cobalt), their sum ($Fe_2O_3+MnO+Cr_2O_3$, mentioned as "Sum") and their determined ratios R1 and R2.

TABLE 1

|  | EX1 | EX2 | EX3 | EX4 | EX5 | EX6 | EX7 | EX8 | EX9 | EX10 | EX11 | EX12 | EX13 |
|---|---|---|---|---|---|---|---|---|---|---|---|---|---|
| $Fe_2O_3$ (wt %) | 0.01 | 1.2 | 0.6 | 0.85 | 0.6 | 0.4 | 0.3 | 0.11 | 0.015 | 0.013 | 0.015 | 0.015 | 0.187 |
| MnO (wt %) | / | 0.2 | 0.3 | 0.4 | 0.8 | 0.3 | 0.5 | 1.4 | 2.36 | 1.4 | 1.4 | 0.8 | 0.73 |
| $Cr_2O_3$ (wt %) | 0.07 | 0.32 | 0.16 | 0.11 | 0.1 | 0.3 | 0.2 | 0 | 0 | 0 | 0.14 | 0.6 | 0.27 |
| Co (wt %) | 0.21 | / | / | / | / | / | / | / | / | / | / | / | / |
| Sum | 0.08 | 1.72 | 1.06 | 1.36 | 1.50 | 1.00 | 1.00 | 1.51 | 2.38 | 1.41 | 1.56 | 1.42 | 1.19 |
| $Fe_2O_3$* (%) | / | 70 | 57 | 63 | 40 | 40 | 30 | 7 | 1 | 1 | 1 | 1 | 16 |
| $Cr_2O_3$* (%) | / | 19 | 15 | 8 | 7 | 30 | 20 | 0 | 0 | 0 | 9 | 42 | 23 |
| MnO* (%) | / | 12 | 28 | 29 | 53 | 30 | 50 | 93 | 99 | 99 | 90 | 57 | 61 |
| R1 | / | 1.34 | 1.31 | 1.57 | 1.38 | 0.82 | 0.83 | 0.80 | 0.10 | 0.14 | 0.07 | 0.02 | 0.49 |
| R2 | / | 1.93 | 1.88 | 2.26 | 2.00 | 1.18 | 1.20 | 1.18 | 0.15 | 0.22 | 0.10 | 0.04 | 0.70 |
| TL (%) | 0.4 | 39.3 | 59.3 | 61.6 | 66.0 | 35.9 | 40.5 | 32.0 | 4.5 | 11.9 | 1.3 | 0 | 0.8 |
| $T_{1050}$ (%) | 54.8 | 28.7 | 46.9 | 33.4 | 50.1 | 87.6 | 89.8 | 90.8 | 88.9 | 90.0 | 87.6 | 83.0 | 86.9 |
| $T_{1550}$ (%) | 0.1 | 51.9 | 65.8 | 55.6 | 68.1 | 90.2 | 91.3 | 91.8 | 91.7 | 91.8 | 91.6 | 90.9 | 91.5 |

Table 1 shows that the presence of total iron, manganese and optionally chromium in contents according to the invention while respecting the conditions put on the "sum", R1 and R2 makes it possible to obtain a glass sheet with a visible transmission that is very low (11.9 to 0%) and with high transmission at 1050 nm (83-90%) and 1550 nm (90.9-91.8%). Not realizing one of the conditions of the invention leads to deteriorate greatly at least one of TL or $T_{1050, 1550}$.

First, concerning example 1, the results show that, even if this glass is "opaque" due to its TL very close to 0, its transmissions at the wavelengths of interest (1050 and 1550 nm) are not satisfying: poor performances at 1050 nm ($T_{1050}$=54.8%) and almost complete absorption of the radiation at 1550 nm ($T_{1550}$=0.1%). This glass sheet was designed to be performant in transmitting lower IR wavelengths, near 850-950 nm ($T_{850}$ of EX1=87.5%).

The FIGURE represents the curves in transmission between the wavelengths 300 and 2000 nm (gathering the visible and near infrared regions) for Examples 3, 6 and 12.

Set #2

Examples 14-23 correspond to glass sheets according to the invention.

Table 2 presents the optical properties for Examples 14 to 23, their respective amounts of iron, manganese and chromium, their sum ($Fe_2O_3+MnO+Cr_2O_3$, mentioned as "Sum") and also their determined ratios R1, R2 and R3.

TABLE 2

|  | EX14 | EX15 | EX16 | EX17 | EX18 | EX19 | EX20 | EX21 | EX22 | EX23 |
|---|---|---|---|---|---|---|---|---|---|---|
| $Fe_2O_3$ (wt %) | 0.58 | 0.015 | 0.58 | 0.06 | 0.581 | 0.015 | 0.297 | 0.015 | 0.015 | 0.015 |
| MnO (wt %) | 0.07 | 1.39 | 0.12 | 1.38 | 0.17 | 3.5 | 0.26 | 2.5 | 0.75 | 2.5 |
| $Cr_2O_3$ (wt %) | 0.74 | 0.05 | 0.73 | 0.09 | 0.73 | 0 | 0.56 | 0.05 | 0.3 | 0.1 |
| $Fe_2O_3$* (%) | 41.7 | 1.0 | 40.6 | 3.9 | 39.2 | 0.4 | 26.6 | 0.6 | 1.4 | 0.6 |
| $Cr_2O_3$* (%) | 53.2 | 3.4 | 51.0 | 5.9 | 49.3 | 0.0 | 50.1 | 1.9 | 28.2 | 3.8 |
| MnO* (%) | 5.0 | 95.5 | 8.4 | 90.2 | 11.5 | 99.6 | 23.3 | 97.5 | 70.4 | 95.6 |
| Sum | 1.39 | 1.46 | 1.43 | 1.53 | 1.48 | 3.52 | 1.12 | 2.57 | 1.07 | 2.62 |
| R1 | 0.60 | 0.11 | 0.60 | 0.31 | 0.60 | 0.07 | 0.44 | 0.07 | 0.05 | 0.06 |
| R2 | 0.86 | 0.16 | 0.87 | 0.45 | 0.87 | 0.10 | 0.63 | 0.11 | 0.07 | 0.09 |
| R3 | 0.09 | 0.97 | 0.14 | 0.94 | 0.19 | 1.00 | 0.32 | 0.98 | 0.71 | 0.96 |
| TL (%) | 8 | 6.7 | 4.5 | 4.3 | 2.7 | 2.1 | 1.47 | 1.71 | 0.3 | 0.63 |
| $T_{1050}$ (%) | 87.5 | 89.3 | 87 | 88.8 | 86.6 | 87.9 | 87.8 | 88.1 | 86 | 86.6 |
| $T_{1550}$ (%) | 90.6 | 91.7 | 90.6 | 91.7 | 90.6 | 91.5 | 91 | 91.6 | 91.4 | 91.5 |

Results from this set of examples (Table 2) show that, for glass sheets with a similar level of TL, better transmission performances at 1050 and/or 1550 nm can be reached with a ratio R3 that increases (R3 being defined as $MnO/(MnO+Cr_2O_3)$, each content being expressed as wt %).

It is to be noted that an increase of $T_{1050}$ or $T_{1550}$ of 0.5% is already significant and of value in most of the described applications (i.e. LIDAR systems).

Set #3

Examples 24-26 correspond to glass sheets according to the invention, with different base compositions (glass matrix) and fixed amounts of total iron, manganese and chromium. Example 24 corresponds to a soda-lime-silicate-type glass, example 25 corresponds to an alumino-silicate-type glass and example 26 corresponds to a borosilicate-type glass.

TABLE 3 presents the optical properties for Examples 24 to 26, their respective base composition and amounts of iron, manganese and chromium, and also their determined ratios R1 and R2.

|  | EX24 | EX25 | EX26 |
|---|---|---|---|
| $SiO_2$ (wt %) | 71.4 | 65.4 | 65.7 |
| $Al_2O_3$ (wt %) | 0 | 7.93 | 0 |
| $B_2O_3$ (wt %) | 0 | 0 | 6 |
| CaO (wt %) | 9.03 | 8.35 | 9.21 |
| MgO (wt %) | 4.22 | 3.86 | 4.18 |
| $Na_2O$ (wt %) | 13.49 | 12.78 | 13.02 |
| $K_2O$ (wt %) | 0.013 | 0.014 | 0.013 |
| $TiO_2$ (wt %) | 0.016 | 0.015 | 0.016 |
| $Fe_2O_3$ (wt %) | 0.194 | 0.192 | 0.2 |
| MnO (wt %) | 0.75 | 0.75 | 0.75 |
| $Cr_2O_3$ (wt %) | 0.55 | 0.55 | 0.55 |
| $SO_3$ (wt %) | 0.29 | 0.20 | 0.34 |
| $Fe_2O_3$* (%) | 13 | 13 | 13 |
| $Cr_2O_3$* (%) | 37 | 37 | 37 |
| MnO* (%) | 50 | 50 | 50 |
| R1 | 0.30 | 0.30 | 0.31 |
| R2 | 0.43 | 0.43 | 0.44 |
| TL (%) | 0 | 0.1 | 0 |
| T1050 (%) | 84.3 | 82.2 | 80.4 |
| T1550 (%) | 91.2 | 89.8 | 90.7 |

The invention claimed is:

1. A silicate-type glass sheet having a composition comprising, in a content expressed as weight percentages, by total weight of glass:

$SiO_2$ 40-78%;
$Al_2O_3$ 0-18%;
$B_2O_3$ 0-18%;
$Na_2O$ 0-20%;
CaO 0-15%;
MgO 0-10%;
$K_2O$ 0-10%;
BaO 0-5%
total iron (expressed as $Fe_2O_3$) 0.002-1.1%;
Manganese (expressed as MnO)≥0.005%;
and optionally,
Chromium (expressed as $Cr_2O_3$) 0-1.3%,
and
wherein
a sum ($Fe_2O_3$+MnO+$Cr_2O_3$) of contents of total iron, manganese and chromium, expressed as weight percentages, ≥1%;
a ratio R1 defined as $Fe_2O_3*/(49+0.43(Cr_2O_3*-MnO*))<1$;
a ratio R2 defined as $Fe_2O_3*/(34+0.3(Cr_2O_3*-MnO*))<1$; $Fe_2O_3*$, MnO* and $Cr_2O_3*$ being relative percentages with respect to the sum ($Fe_2O_3$+MnO+$Cr_2O_3$), and
the glass sheet has a TLD4 lower than 20%.

2. The silicate-type glass sheet according to claim 1, wherein the composition comprises: manganese (expressed as MnO)≤4%.

3. The silicate-type glass sheet according to claim 1, wherein the composition comprises: manganese (expressed as MnO)≤3%.

4. The silicate-type glass sheet according to claim 1, wherein

| Manganese (expressed as MnO) | >1 %; and |
|---|---|
| Chromium (expressed as $Cr_2O_3$) | 0-0.15 %. |

5. The silicate-type glass sheet according to claim 4, wherein the composition comprises: total iron (expressed as $Fe_2O_3$) 0.002-0.1%.

6. The silicate-type glass sheet according to claim 4, wherein the composition comprises chromium (expressed as $Cr_2O_3$) 0-0.1%.

7. The silicate-type glass sheet according to claim 4, wherein the composition is free of $Cr_2O_3$.

8. The silicate-type glass sheet according to claim 1, wherein the composition comprises:

| Manganese (expressed as MnO) | 0.005-1 %; and |
|---|---|
| Chromium (expressed as $Cr_2O_3$) | 0.2-1.3 %. |

9. The silicate-type glass sheet according to claim 8, wherein the composition comprises: Manganese (expressed as MnO) 0.03-1%.

10. The silicate-type glass sheet according to claim 1, wherein $Fe_2O_3+MnO+Cr_2O_3 \geq 1.1\%$.

11. The silicate-type glass sheet according to claim 10, wherein the composition comprises:

| Manganese (expressed as MnO) | 0.005-1 %; and |
|---|---|
| Chromium (expressed as $Cr_2O_3$) | 0.2-1.3 %. |

12. The silicate-type glass sheet according to claim 11, wherein the composition comprises: Manganese (expressed as MnO) 0.03-1%.

13. The silicate-type glass sheet according to claim 1, wherein a ratio R3, defined as $MnO/(MnO+Cr_2O_3)>0.7$.

14. The silicate-type glass sheet according to claim 13, wherein R3>0.9.

15. The silicate-type glass sheet according to claim 1, wherein the glass sheet has a TLD4 lower than 5%.

16. The silicate-type glass sheet according to claim 1, wherein the glass sheet has a $T_{1050}$ higher than 82%.

17. The silicate-type glass sheet according to claim 1, wherein the glass sheet has a $T_{1550}$ higher than 85%.

18. The silicate-type glass sheet according to claim 1, having a $T_{1550}$ higher than 80%.

19. The silicate-type glass sheet according to claim 1, wherein the glass sheet is formed by a float glass process, a drawing process, or a rolling process.

20. A silicate-type glass sheet having a composition comprising, in a content expressed as weight percentages, by total weight of glass:
$SiO_2$ 40-78%;
$Al_2O_3$ 0-18%;
$B_2O_3$ 0-18%;
$Na_2O$ 0-20%;
CaO 0-15%;
MgO 0-10%;
$K_2O$ 0-10%;
BaO 0-5%
total iron (expressed as $Fe_2O_3$) 0.002-1.1%;
manganese (expressed as MnO)≥0.005%;
and optionally,
chromium (expressed as $Cr_2O_3$) 0-1.3%, and
wherein
a sum ($Fe_2O_3+MnO+Cr_2O_3$) of contents of total iron, manganese and chromium, expressed as weight percentages, ≥1%,
a ratio R1 defined as $Fe_2O_3*/(49+0.43(Cr_2O_3*-MnO*))$ <1; and
a ratio R2 defined as $Fe_2O_3*/(34+0.3(Cr_2O_3*-MnO*))$ <1; $Fe_2O_3*$, MnO* and $Cr_2O_3*$ being relative percentages with respect to the sum ($Fe_2O_3+MnO+Cr_2O_3$).

21. A silicate-type glass sheet having a composition comprising, in a content expressed as weight percentages, by total weight of glass:
$SiO_2$ 40-78%;
$Al_2O_3$ 0-18%;
$B_2O_3$ 0-18%;
$Na_2O$ 0-20%;
CaO 0-15%;
MgO 0-10%;
$K_2O$ 0-10%;
BaO 0-5%
total iron (expressed as $Fe_2O_3$) 0.002-1.1%;
manganese (expressed as MnO) 0.005-1%; and
chromium (expressed as $Cr_2O_3$) 0.2-1.3%,
wherein
a sum ($Fe_2O_3+MnO+Cr_2O_3$) of contents of total iron, manganese and chromium, expressed as weight percentages, ≥1%,
a ratio R1 defined as $Fe_2O_3*/(49+0.43(Cr_2O_3*-MnO*))$ <1; and
a ratio R2 defined as $Fe_2O_3*/(34+0.3(Cr_2O_3*-MnO*))$ <1; $Fe_2O_3*$, MnO* and $Cr_2O_3*$ being relative percentages with respect to the sum ($Fe_2O_3+MnO+Cr_2O_3$).

* * * * *